United States Patent [19]
Pan et al.

[11] Patent Number: 5,768,427
[45] Date of Patent: Jun. 16, 1998

[54] METHOD AND SYSTEM FOR COMPRESSING A VIDEO SIGNAL USING NONLINEAR INTERPOLATION

[75] Inventors: Shao Wei Pan, Schaumburg; Shay-Ping T. Wang, Long Grove, both of Ill.

[73] Assignee: Motorola, Inc., Schaumburg, Ill.

[21] Appl. No.: 496,270

[22] Filed: Jun. 27, 1995

[51] Int. Cl.[6] .............................. G06K 9/00; G06K 9/36; H04N 7/12
[52] U.S. Cl. ......................... 382/232; 382/240; 382/166; 382/239; 348/390
[58] Field of Search ............................. 382/239, 166, 382/232, 240, 302; 348/400, 402, 405, 421, 390, 384, 420, 410, 409; 358/432, 433, 426; 341/67; 345/139

[56] References Cited

U.S. PATENT DOCUMENTS 5,122,873   6/1992   Golin ................................. 348/390
5,510,838   4/1996   Yomdin et al. ...................... 348/384
5,588,069   12/1996  Katayama et al. ................... 382/166

*Primary Examiner*—Leo Boudreau
*Assistant Examiner*—Wenpeng Chen
*Attorney, Agent, or Firm*—S. Kevin Pickens

[57] ABSTRACT

A video signal is converted into a coefficient signal of block coefficient signals for each frame in a video image. Each of the block coefficient signals represents the pixels in a pixel map block (420) with the coefficients in a hybrid polynomial. The hybrid polynomial contains discrete cosine terms, a constant term separated from the discrete cosine terms, and polynomial terms separated from the discrete cosine terms. Coefficient signals for selected frames only are transmitted to a receiving computer (130). The coefficient signals for the selected frames are converted to decompressed pixel map signals and the pixel map signals for unselected frames are interpolated using nonlinear interpolation. The decompressed pixel map signals and interpolated pixel map signals are ordered into an original frame sequence to produce a decompressed video signal.

20 Claims, 6 Drawing Sheets

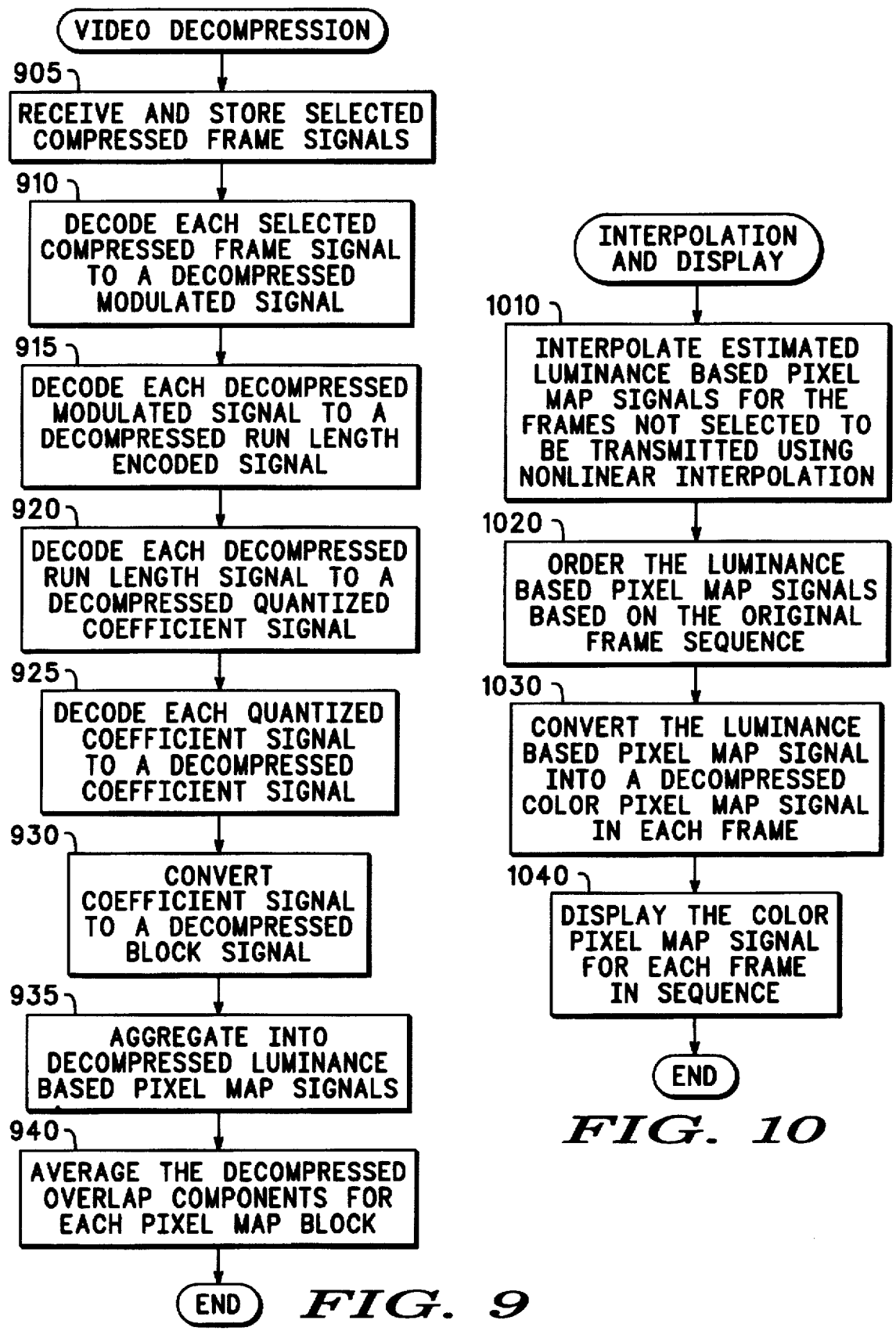

1

METHOD AND SYSTEM FOR COMPRESSING A VIDEO SIGNAL USING NONLINEAR INTERPOLATION

RELATED INVENTIONS

The present invention is related to the following inventions which are assigned to the same assignee as the present invention:

"Method and System for Compressing a Pixel map Signal using a Hybrid Polynomial Coefficient Signal", having Ser. No. 08,495,836, filed concurrently herewith.

"Method and System for Compressing a Video Signal using a Hybrid Polynomial Coefficient Signal", having Ser. No. 08,498,154, filed concurrently herewith, now U.S. Pat. No. 5,612,899.

"Method and System for Compressing a Pixel map Signal using Dynamic Quantization", having Ser. No. 08,495,123, filed concurrently herewith.

"Method and System for Compressing a Pixel map Signal using Block Overlap", having Ser. No. 08,495,769, filed concurrently herewith.

"Method and System for Compressing a Video Signal using Dynamic Frame Recovery", having Ser. No. 08,496,122, filed concurrently herewith.

The subject matter of the above-identified related inventions are hereby incorporated by reference into the disclosure of the invention.

TECHNICAL FIELD

This invention relates generally to computer implemented visual images and, more particularly, to compression of digital signals representing such images.

BACKGROUND OF THE INVENTION

A computer implemented visual image can be represented by a digital signal. Such a digital signal comprises a pixel map of pixel data representing a set of pixels that are displayed by a computer on a computer screen. However, a large volume of such pixel data is required to accurately represent a visual image using every pixel on the computer screen. Further, in the case of a moving visual images (video image) rather than a single, fixed visual image (still image), an even larger amount of pixel data is necessary to represent every frame in the video image. The large volume of pixel data required to represent an image may exceed or greatly inhibit the capacity of a storage device. Additionally, where a visual image is to be displayed on a remote device, especially in the case of a video image, the large amount of digital data often cannot be efficiently transmitted to the remote device within the limitations of existing media.

Various methods of data compression, often called image compression, have been employed to minimize the above problems. However, there is typically a limit to the extent that pixel data can be compressed without losing accuracy of the pixel data, and thus quality of the visual image, upon decompression. In general, with such methods, image quality deteriorates as data compression increases. As a result, the quality of visual images is limited to a significant extent in a wide variety of media and configurations. Thus, a more efficient means of image compression is desired which does not significantly reduce the quality of visual images.

BRIEF DESCRIPTION OF THE DRAWINGS

FIG. 9 is a flowchart of a video decompression process performed by a preferred embodiment of the present invention.

FIG. 10 is a flowchart of an interpolation and display process performed by a preferred embodiment of the present invention.

DESCRIPTION OF THE PREFERRED EMBODIMENT

In a preferred embodiment of the invention, a video signal is compressed using coefficient signals each representing a hybrid polynomial. The video signal contains pixel map signals each comprising a pixel map of pixel data representing pixels in a single frame in a moving, computer implemented visual image, called a video image. The pixel map signal for each frame is separated into a plurality of block signals, each representing a pixel map block in the pixel map. The block signals are compressed by converting the block signals into a coefficient signal made up of block coefficient signals, each block coefficient signal corresponding to one of the block signals.

Each block coefficient signal in the coefficient signal for each frame is thus a compressed frame signal which represents, for each pixel map block, the coefficients in a hybrid polynomial. The hybrid polynomial contains discrete cosine terms, a constant term separated from the discrete cosine terms, and polynomial terms separated from the discrete cosine terms. Each block coefficient signal contains a background component representing a coefficient of the constant term, a linear component representing the coefficients of the polynomial terms, and a nonlinear component representing the coefficients of the discrete cosine terms. The background component represents constant, unchanging pixel values in a pixel map block, the linear component represents linearly changing pixel values in a pixel map block, and the nonlinear component represents nonlinear patterns in a pixel map block.

Conversion to the compressed frame signals provides the advantage of a substantial compression for many frames because the background component and the linear component, which contain only a small number of coefficients, are isolated from the nonlinear component, which contains a very large number of coefficients, in each block coefficient signal. The background component and linear component represent commonly occurring patterns for many of the pixel map blocks. Thus, only a small amount of data is often required to represent many of the pixel map blocks in many of the frames. Preferably, the compression process described above is combined with a number of other compression techniques, as will be described below. As a result, a high rate of compression can be achieved with no more than minimal loss of image quality.

In the preferred embodiment of the invention, a still greater compression is achieved because the compressed frame signals for only selected frames are transmitted, stored, or otherwise utilized. When the compressed frame signals for the selected frames are later decompressed, they are converted into decompressed pixel map signals. Interpolated pixel map signals are interpolated for the unselected frames using nonlinear interpolation. The decompressed pixel map signals and interpolated pixel map signals are then ordered into an original frame sequence to produce a decompressed video signal.

Figure 1:
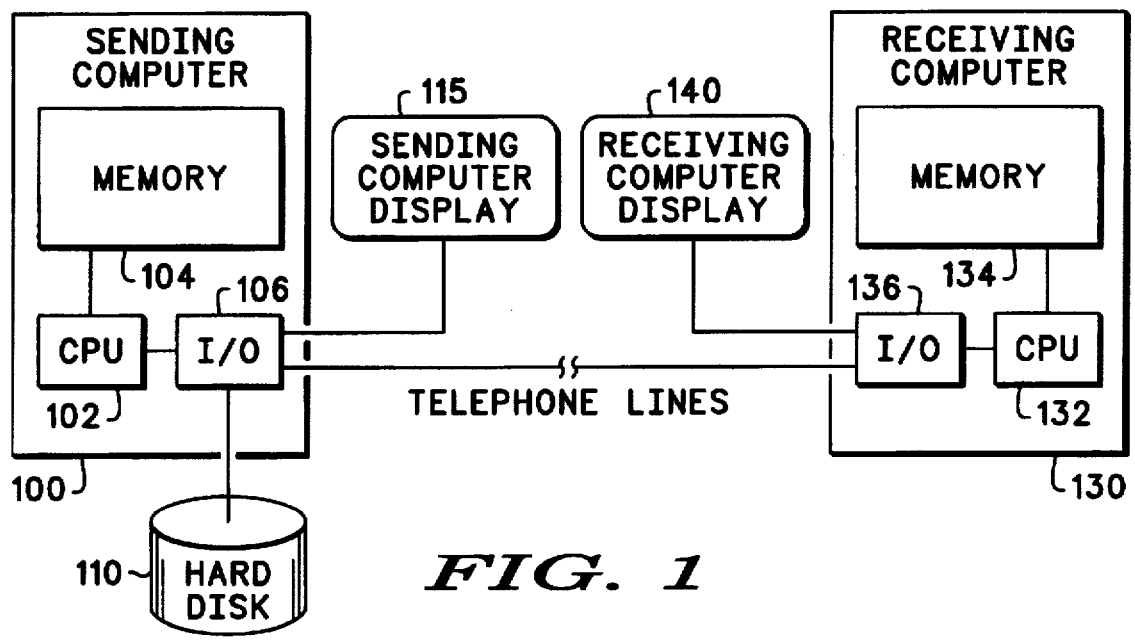
FIG. 1 is a block diagram of a computer system suitable for implementation of a preferred embodiment of the present invention.

FIG. 1 shows a block diagram of a computer system suitable for implementation of a preferred embodiment of the present invention. In FIG. 1, a sending computer 100 includes a sending computer processor 102, sending computer memory 104 and sending computer input/output unit 106. The sending computer 100 is connected to a hard disk 110, which could alternatively be a compact disk or other storage device. The sending computer 100 is also connected to a sending computer display 115. The sending computer 100 could equivalently be any computing element, circuit, or the like capable of processing, storing and transferring information in any form.

The sending computer 100 is connected via a telephone line 120 to a receiving computer 130. Alternatively, the telephone line 120 could be a wire network, a cable or any other medium capable of transmitting digital data or equivalent information in any form. The receiving computer 130 includes a receiving computer processor 132, receiving computer memory 134 and receiving computer input/output unit 136. The receiving computer 130 is connected to a receiving computer display 140. The receiving computer 130 could equivalently be any computing element, circuit, or the like capable of processing, storing and transferring information in any form.

In a preferred embodiment, the sending computer 100 transmits digital data to the receiving computer 130, and is thus denoted a "sending computer" herein. It is noted, however, that some features of the present invention may be performed solely within a single computer such as the sending computer 100. In such a case, the sending computer 100 may not be a "sending computer" in the strictest terminology, but is referred to as such herein for the sake of consistency and simplicity of explanation of the preferred embodiment as a whole.

Figure 2:
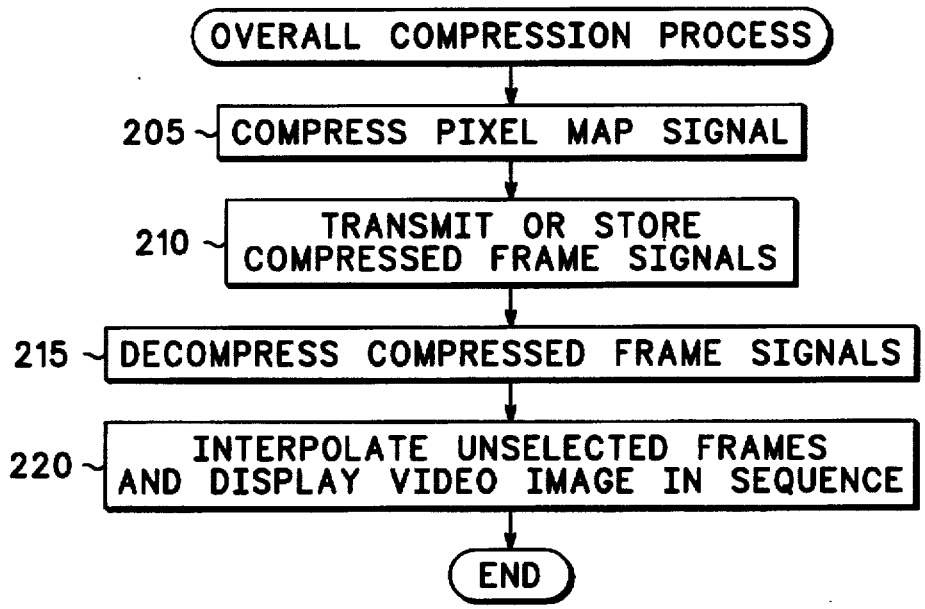
FIG. 2 is a flowchart of an overall compression process performed by a preferred embodiment of the present invention.

An overview of the process performed by the computer system shown in FIG. 1 will now be explained with reference to FIG. 2. FIG. 2 is a flowchart of an overall compression process performed by a preferred embodiment of the present invention. In step 205, the sending computer 100 compresses a pixel map signal comprising a pixel map of pixel data representing the pixels in a single, fixed visual image. The single, fixed visual image is referred to herein as a still image. Step 205 will be explained later in detail with reference to FIG. 3, FIG. 4, FIG. 5 and FIG. 6.

As will be explained, in the case of a "moving" visual image, step 205 may be performed many times to produce a number of compressed pixel map signals, called compressed frame signals, which each represent a frame in the moving visual image. Each frame is thus a still image. When displayed rapidly in sequence, the frames create the moving visual image, which will be referred to herein as a video image.

In a preferred embodiment of the invention, the sending computer 100 transfers the video image to the receiving computer 130 for display by the receiving computer display 140. Specifically, in step 210, the sending computer 100 transmits the compressed frame signals representing selected frames of the video image to the receiving computer 130 via the telephone line 120 or an alternative media as explained above. As will be explained, in the preferred embodiment, only selected compressed frame signals representing selected frames are actually transmitted. Step 210 will be explained later in detail with reference to FIG. 7 and FIG. 8. Alternatively, where transfer to another computer, computing element, circuit or the like is not required, the sending computer 100 stores the compressed frame signals in the sending computer memory 104, in the hard disk 110 via the sending computer input/output unit 106, or in some other memory or storage device.

In step 215, the receiving computer 130 receives and decompresses the compressed frame signals representing the selected compressed frames of the video image. Alternatively, where the compressed frame signals are not transferred but stored, as mentioned above, the sending computer 100 reads the compressed frame signals from the hard disk 110 or appropriate storage device. Step 215 will be explained later in detail with reference to FIG. 9. As will also be explained, in a preferred embodiment, the frames not selected are interpolated at decompression. In step 220, the receiving computer 130 interpolates the unselected frames not transmitted in step 210 (or stored, alternatively, as explained above) and displays a reconstructed video image including both the selected frames and the interpolated frames, ordered into the original frame sequence. Step 220 will be explained later in detail in FIG. 10. The overall compression process of FIG. 2 will be more fully explained in the remainder of the specification.

In an alternative embodiment of the invention, in the case of a still image, step 205 is performed only once to produce a compressed pixel map signal which is transmitted in step 210, or, alternatively, stored in step 210. The compressed pixel map signal is decompressed in step 215 and displayed in step 220.

Figure 3:
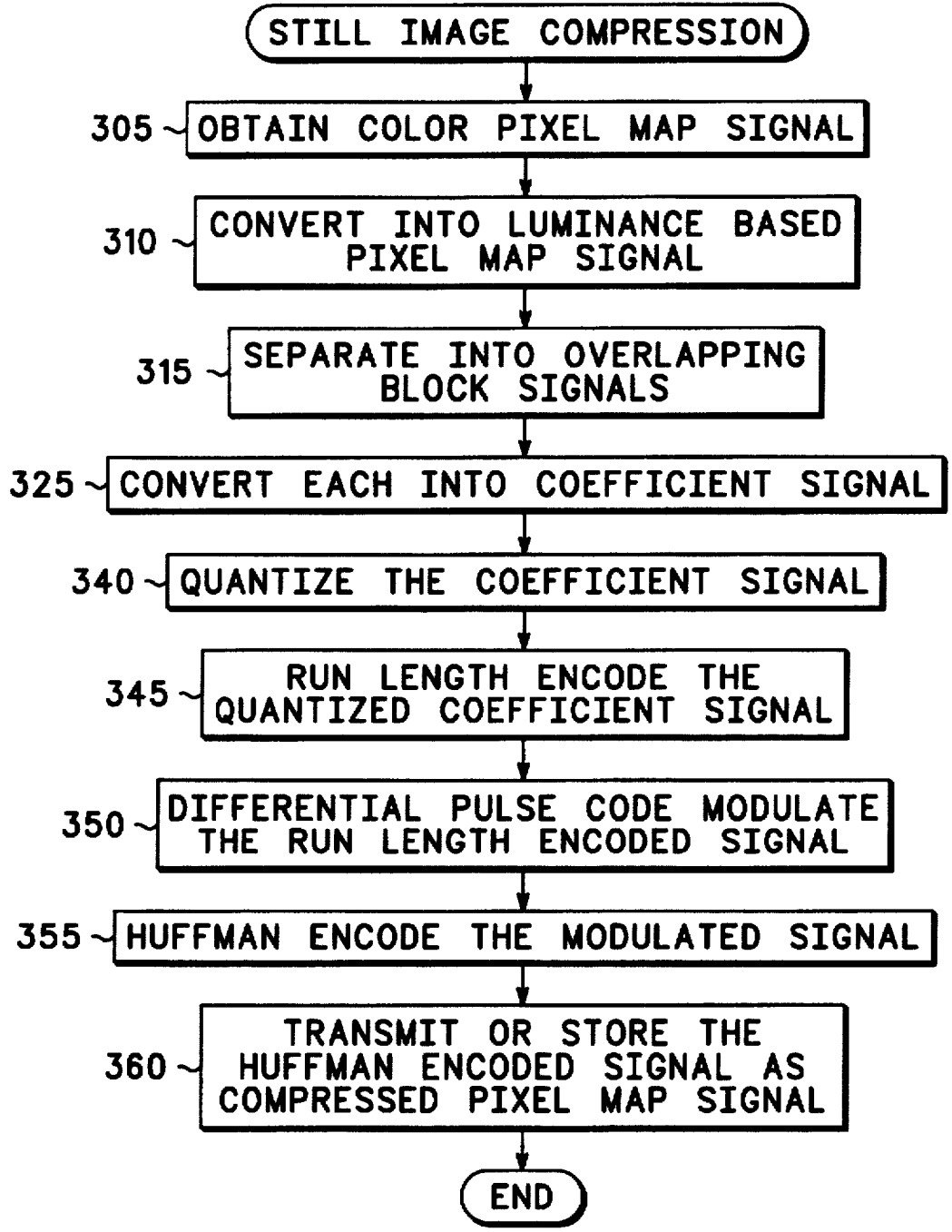
FIG. 3 is a flowchart of a still image compression process performed by a preferred embodiment of the present invention.

FIG. 3 is a flowchart of a still image compression process performed by a preferred embodiment of the present invention. This process corresponds to step 205 of FIG. 2 and will be further illustrated with reference to FIG. 4, FIG. 5 and FIG. 6. In the embodiment described herein, the still image compression process is implemented as software executed by the sending computer processor 102. In an alternative embodiment, the sending computer processor 102 and/or receiving computer processor 132 include a polynomial processor which perform the polynomial processing functions described herein, such as the polynomial processor described in "Neural Network and Method of Using Same", having Ser. No. 08/076,601, which is herein incorporated by reference. It is noted that the flowcharts described herein do not necessarily correspond directly to lines of software code, but are provided as illustrative of the concepts involved in the relevant process so that one of ordinary skill in the art will best understand how to implement those concepts in the specific configuration and circumstances at hand.

Returning to FIG. 3, initially, in step 305, the sending computer 100 obtains a pixel map signal comprising a pixel map of pixel data. The pixel data represents pixels in a still image displayable on a display device such as the sending computer display 115 or receiving computer display 140. The pixel map signal may be obtained from the hard disk 110 or another storage device. Alternatively, the pixel map signal may be obtained via a communications medium, a scanner or other device.

In the preferred embodiment, the pixel map signal is a color pixel map signal including a red color component representing a red intensity of each pixel in the still image, a green color component representing a green intensity of each pixel in the still image, and a blue color component representing a blue intensity of each pixel in the still image. The color pixel map signal is, for example, a standard RGB (Red Green Blue) signal, which will be familiar to those of ordinary skill in the art. The pixel data in the color pixel map signal represents each pixel with a 24 bit RGB vector consisting of an 8 bit value for the red color component, an 8 bit value for the green color component and an 8 bit value for the blue color component.

In step 310, the sending computer 100 converts the color pixel map signal into a luminance based pixel map signal. The luminance based pixel map signal includes a luminance component representing a luminance of each pixel in the still image, a saturation component representing a saturation of each pixel in the still image, and a hue component representing a hue of each pixel in the still image. The luminance based pixel map signal is, for example, a digital YUV signal equivalent to the well known YUV television signal. The transformation between RGB values and YUV values is easily accomplished by those of ordinary skill in the art. The conversion formula from RGB to YUV is:

$$Y = 0.229R + 0.587G + 0.114B$$

$$U = -0.1678R + -0.3313G + 0.5B + 128$$

$$V = 0.5R + -0.4187G - 0.0813B + 128$$

It has been found that the human eye is particularly aware of the luminance aspect of an image as opposed to the saturation and hue. Thus, a smaller range of values is needed to represent the saturation and hue aspect of each pixel. Accordingly, each pixel is represented in the luminance based pixel map signal by the equivalent of a 12 bit value consisting of an 8 bit value for the luminance component, and the equivalent of a 2 bit value for the saturation component and a 2 bit value for the hue component. Specifically, each RGB vector is first converted into a YUV vector having an 8 bit value for the luminance component, an 8 bit value for the hue component and an 8 bit value for the saturation component. The hue component and saturation component for every four YUV vectors are subsampled to produce a single hue component and a single saturation component. Thus, for every four YUV vectors, the total number of components is reduced from 12 (4 luminance components, 4 hue components and 4 saturation components) to 6 (4 luminance components, 1 hue component and 1 saturation component.) As a result, the conversion from a color pixel map signal to a luminance based pixel map signal achieves the advantage of a 2 to 1 image compression ratio without losing detectable image quality.

Figure 4:
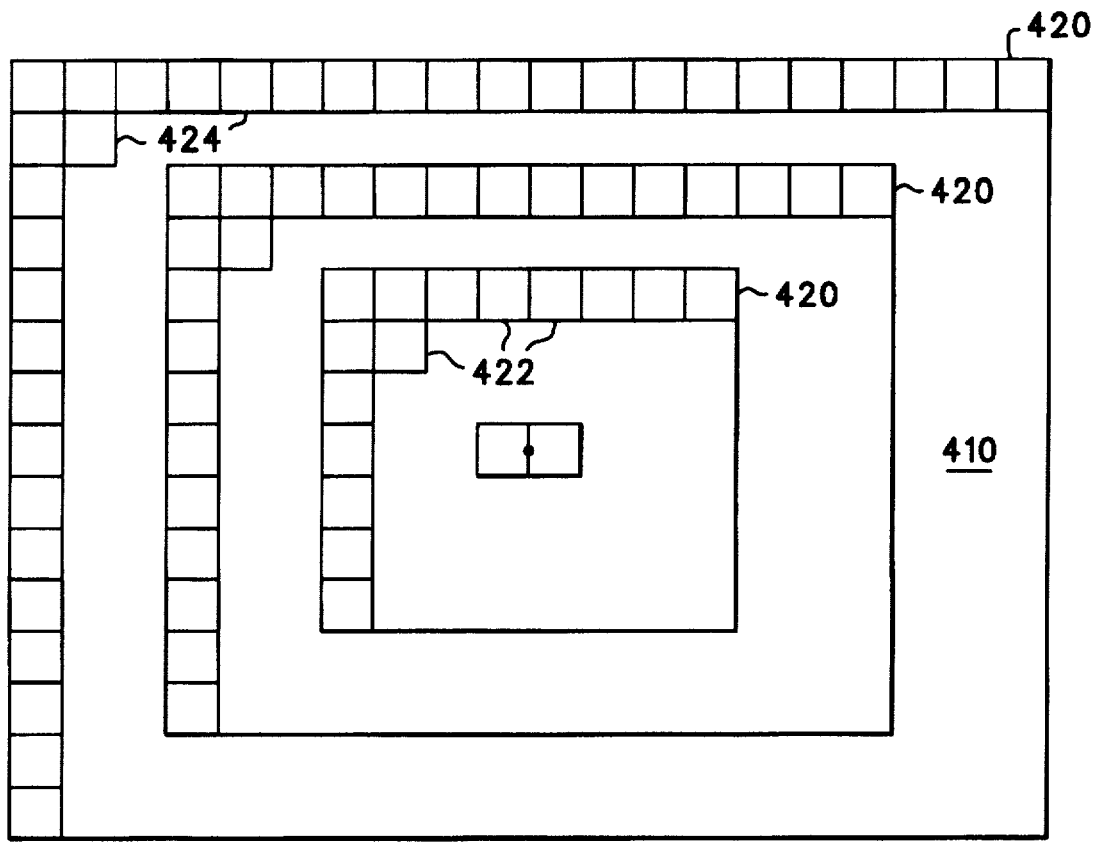
FIG. 4 is an illustration of a partitioned pixel map provided in accordance with a preferred embodiment of the present invention.

In step 315, the luminance based pixel map signal is separated into block signals. Each block signal represents a block produced by partitioning the pixel map of pixel data in a manner so as to divide the visual image into blocks. FIG. 4 is an illustration of a partitioned pixel map provided in accordance with a preferred embodiment of the present invention. In the preferred embodiment, a 640 by 480-pixel visual image 400 is divided by partitioning a pixel map 410, which represents the visual image 400, into 300 (20 by 15) pixel map blocks 420. Each of the pixel map blocks 420 consists of 1024 (32 by 32) pixels. Alternatively, the pixel map blocks can be, for example, 256 (16 by 16) pixels or 64 (8 by 8) pixels.

Figure 5:
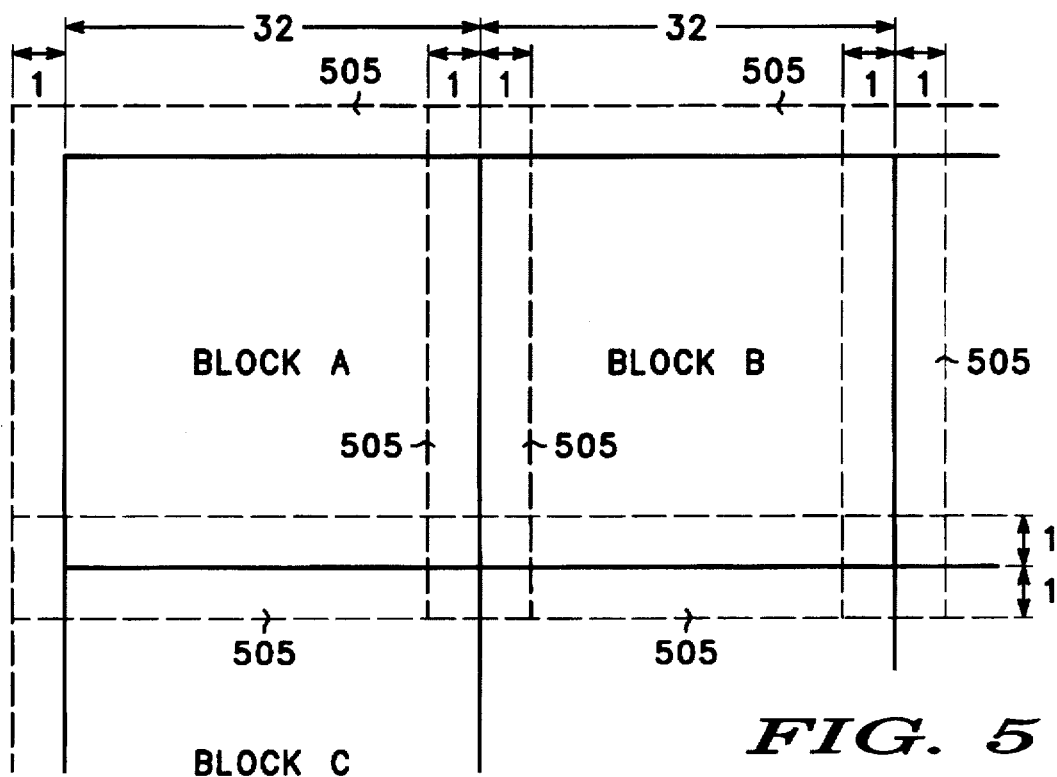
FIG. 5 is an illustration of overlapping blocks in the partitioned pixel map provided in accordance with a preferred embodiment of the present invention.

In a particularly preferred embodiment, the luminance based pixel map signal is separated into block signals which each represent overlapping pixel map blocks 420. FIG. 5 is an illustration of overlapping pixel map blocks 420 in the partitioned pixel map 410 provided in accordance with the particularly preferred embodiment. The overlapping pixel map blocks 420 shown in FIG. 5 are similar to the 32 by 32-pixel pixel map blocks 420 described above, except that each of the pixel map blocks in FIG. 5 contains an overlap component 505 representing pixels contained both by a corresponding block and a block adjacent to the corresponding block. The overlap components 505 contain pixel values from adjacent blocks, except that pixel map blocks 420 in the outer edge blocks, which have no adjacent blocks at the outer edges, copy their own pixel values into the overlap components at the outer edges, such as the leftmost edges of blocks A and C and the uppermost edges of blocks A and B in FIG. 5.

For example, in FIG. 5, blocks A and B are horizontally adjacent pixel map blocks 420 and thus block A has a vertical overlap component 505 which extends horizontally rightward one pixel over into block B. Similarly, block B has a vertical overlap component 505 which extends horizontally leftward into block A. Blocks A and C are vertically adjacent pixel map blocks 420 and thus each have a horizontal overlap component 505 which extends vertically in a similar fashion. In the preferred embodiment shown in FIG. 5, the overlap component 505 is 1 pixel wide for each of the pixel map blocks 420, and thus the block signal for each of the pixel map blocks 420 represents 34 by 34 pixels. One of ordinary skill in the art may readily implement the concept of overlapping pixel map blocks in a variety of ways based on the implementation described herein. As will be explained later in the specification, the use of overlapping pixel map blocks 420 provides the advantage of a reduction in a noticeable blocking effect after decompression of the compressed pixel map signal.

Returning to FIG. 3, in step 325, the block signals are converted into a coefficient signal. The coefficient signal comprises block coefficient signals which each correspond to one of the block signals and which each represent, for each of the pixel map blocks 420, coefficients in a specially formulated equation, called herein a hybrid polynomial. It is known in the art to represent a visual image or a portion thereof with a discrete cosine equation. The hybrid polynomial is produced by separating specific polynomial terms from such a discrete cosine equation. In the preferred embodiment of the present invention, two modifications are made to a discrete cosine equation representing each of the pixel map blocks 420. The first of these modifications is that the first order polynomial terms are separated from the discrete cosine terms. The second of these modifications is that the first term in the discrete cosine equation, called the constant term, is separated from the discrete cosine terms. One of ordinary skill in the art will readily implement these modifications. The hybrid polynomial is thus represented by the following equation:

$$f(x, y) = a_1x + a_2y + c_{00} + \sum_{i=0}^{N-1}\sum_{j=0}^{N-1} c_{ij} \cos(2\pi ix/N)\cos(2\pi jy/N)$$

where N is the height and width of the pixel map blocks 420 in pixels. For example N=32 for a 32 by 32 pixel block, which has 1024 pixels. There are thus 32 summations of 32 summations of the $c_{ij}$ cos($2\pi ix/N$) cos($2\pi jy/N$) term, except for the first term $c_{00}$, a total of 1024−1=1023 terms.

In the preferred embodiment, which implements a color pixel map signal as indicated above, the coefficient signal separately comprises a luminance signal representing the luminance component, a saturation signal representing the saturation component and a hue signal representing the hue component, each of which contains in each of the block coefficient signals for each of the pixel map blocks 420 a linear component representing the coefficients of the polynomial terms, a background component representing the coefficient of the constant term, and a nonlinear component representing the coefficients of the discrete cosine terms in separate hybrid polynomials for the luminance component, the saturation component and the hue component.

The background component contains the coefficient $c_{00}$ of the constant term. The constant term $c_{00}$ is a constant which represents the values of the pixels in an entire block. Thus, for the luminance component, the $c_{00}$ coefficient indicates a constant background luminance. The linear component contains the coefficients $a_1$ and $a_2$ of the first order polynomial terms $a_1x$ and $a_2y$, respectively. The first order polynomial terms $a_1x$ and $a_2y$ represent a linear change in the x and y directions, respectively, of the values which represent the pixels in the block. Thus, for example, for the luminance component, the $a_1$ and $a_2$ coefficients indicate a linearly changing pattern in the luminance of the block in the x and y directions, respectively.

The nonlinear component contains the coefficients $c_{ij}$ of the discrete cosine terms $c_{ij}$ cos($2\pi ix/N$) cos($2\pi jy/N$) in the summation, except for $c_{00}$. These discrete cosine terms $c_{ij}$ cos($2\pi ix/N$) cos($2\pi jy/N$) represent nonlinear changes in the values of the pixels in one of the pixel map blocks 420. Thus, for the luminance component, the $c_{ij}$ coefficients indicate a nonlinearly changing pattern in the luminance of a block. The constant term $c_{00}$ is a constant which represents the values of the pixels in an entire block. Thus, for the luminance component, the $c_{00}$ coefficient indicates a constant background luminance.

In an alternative embodiment, the hybrid polynomial also includes second order polynomial terms and can be expressed as:

$$f(x, y) = a_1x + a_2y + a_3x^2 + a_4y^2 + a_5xy + c_{00} +$$

$$\sum_{i=0}^{N-1}\sum_{j=0}^{N-1} c_{ij} \cos((2x+1)i\pi/2N)\cos((2y+1)j\pi/2N)$$

where $a_3$, $a_4$ and $a_5$ are second order polynomial terms which represent a second order nonlinear change of the value of the pixels in a block. The discrete cosine terms $c_{ij}$ cos($(2x+1)i\pi/2N$)) cos($(2y+1)j\pi/2N$)) represent other nonlinear changes in the values of the pixels in the block. The advantage of using second order polynomial terms is that they can represent simple nonlinear patterns such as a quadratic or parabolic surface.

Conversion to the coefficient signal provides the advantage of a substantial compression of the data necessary to represent the corresponding block. This is because, as can be seen from the explanation of the hybrid polynomial above, the terms which represent many commonly occurring patterns in an image have been isolated into a very small number of terms. Thus, only a very small number of coefficients in the coefficient signal are required to represent such patterns. For example, if an image consists partly of a dark background having a consistent luminance, then f(x,y) =$c_{00}$ for the luminance component in the pixel map blocks 420 containing the dark background and thus the luminance of those pixel map blocks 420 can be represented by a single value, that of the coefficient $c_{00}$. All of the discrete cosine terms and polynomial terms are eliminated.

Similarly, if a lighter portion of the image fades consistently into a darker portion such that the luminance of some pixel map blocks 420 changes linearly, then f(x,y)=$a_1$x+$a_2$y+ $c_{00}$ for the luminance component, and thus the luminance of those blocks can be represented by only those three values. All of the discrete cosine terms are eliminated. For example, assume a 4 by 4 pixel block represented by the following luminance values:

| 25 | 26 | 27 | 28 |
| 26 | 27 | 28 | 29 |
| 27 | 28 | 29 | 30 |
| 28 | 29 | 30 | 31 |

In this case, the background component coefficient is $c_{00}$=25 and the linear component coefficients are $a_1$=1 and $a_2$=1, such that the hybrid polynomial equation f(x,y)=25+x+y represents the luminance of the block, and only three coefficients in the coefficient signal (25,1,1) are required to represent the entire block.

Further, although some pixel map blocks 420 in a typical image may not readily appear representable with purely linear or constant coefficients as in the simple example above, many pixel map blocks 420 may contain a combination of one or more linear patterns and a constant background. In this case, the coefficient signal represents such a combination with a limited number of coefficients. This can be seen by theoretically dividing a pixel map block 420 into virtual "sub-blocks" for illustrative purposes. For example, assume that a pattern shaped like a "7" is superimposed on, and within, the 4 by 4 pixel block in the above example, such that:

| 25 | 100 | 100 | 28 |
| 26 | 27  | 100 | 29 |
| 27 | 28  | 100 | 30 |
| 28 | 29  | 100 | 31 |

In this case, the pixel map block 420 can be thought of as divided into two sub-blocks as follows:

| 25 | 26 | 27 | 28 |     | 0 | 74 | 73 | 0 |
| 26 | 27 | 28 | 29 |     | 0 | 0  | 72 | 0 |
| 27 | 28 | 29 | 30 | and | 0 | 0  | 71 | 0 |
| 28 | 29 | 30 | 31 |     | 0 | 0  | 70 | 0 |

The first sub-block can be represented by 3 coefficients (the linear and background coefficients $a_1$, $a_2$ and $c_{00}$, as in the example above.) The second sub-block is represented by a nonlinear component representing nonlinear coefficients. However, many coefficients are eliminated and the coefficient signal is simplified down to four additional coefficients, the rest being 0.

In step 340, the sending computer 100 quantizes the coefficient signal for each block to produce a quantized coefficient signal, still further reducing the amount of data necessary to represent the image. The sending computer 100 quantizes the coefficient signal by dividing a value of each coefficient in the coefficient signal by a quantization factor, rounding a resulting value to a nearest integer value to produce a quantized coefficient value and replacing the original value of the coefficient with the quantized coefficient value for each coefficient in the coefficient signal to produce the quantized coefficient signal. When the quantized coefficient signal is decompressed at some later point in time, the quantized coefficient value will be multiplied by the quantization factor. Thus, where a smaller quantization factor is used, compression is more minimal but accuracy is more preserved. Conversely, where a larger quantization factor is used, more compression is achieved but less accuracy is preserved.

In the preferred embodiment of the invention, the coefficients of lower frequency discrete cosine terms represented by the nonlinear component are preserved to a greater extent as they represent aspects of the image that are more significantly noticeable to the human eye, and thus are divided by a smaller quantization factor than the coefficients of higher frequency discrete cosine terms represented by the nonlinear component. The coefficients of the higher frequency terms represented by the nonlinear component are divided by a larger quantization factor and thus require less data or may even be eliminated altogether. As a result, the less visually significant the aspects represented by given coefficients are, then generally the more compressed those coefficients are within the quantized coefficient signal. Thus, quantization of the coefficient signal provides the advantage of additional compression with minimal loss to image quality.

Figure 6:
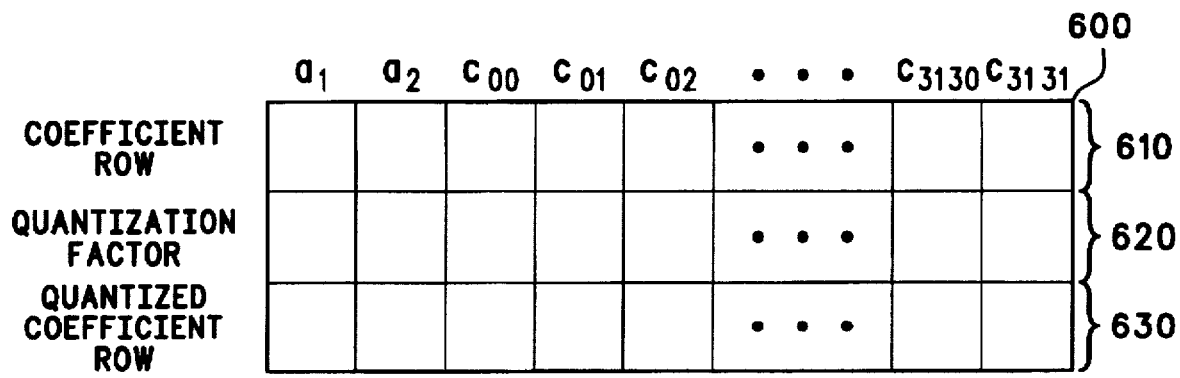
FIG. 6 is an illustration of a quantization table provided in accordance with a preferred embodiment of the present invention.

In the preferred embodiment, quantization is achieved using a quantization table. FIG. 6 is an illustration of a quantization table provided in an embodiment of the present invention. The quantization table 600 is implemented by the sending computer 100 and stored in the sending computer memory 104. One of ordinary skill in the art will recognize that the quantization table 600 may be implemented in different ways, and may not actually be in the form of a table data structure. Depending on the implementation and circumstances, for example, the coefficients once quantized may not be saved, freeing up memory or storage space, if so required. It is also noted that the rows shown in FIG. 6 are illustrative of the interrelationships among the data shown and do not necessarily indicate physical storage locations.

The quantization table 600 in FIG. 6 includes a coefficient row 610 which contains the coefficients in the coefficient signal for each block. The quantization table 600 further includes a quantization factor row 620 which includes the quantization factors, each quantization factor corresponding to a coefficient in the coefficient signal. These quantization factors define the degree of quantization, and thus the extent of compression, that will be applied to the coefficient signal for each coefficient. Finally, the quantization table 600 includes a quantized coefficient row 630 which contains the quantized coefficients after the quantization factors are applied to the corresponding coefficients. Specifically, the coefficients in the coefficient row 610 are divided by the corresponding quantization factors in the quantization factor row 620 and the resulting value is rounded to the nearest integer, producing a quantized coefficient value which can usually be represented by a smaller number of bits than the original coefficient value. The original coefficient values in the coefficient signal are replaced by the quantized coefficient values to produce the quantized coefficient signal.

For example, if the table shown in FIG. 6 contains the following coefficient values in the coefficient row 610 (first row) and the following quantization factors in the quantization factor row 620 (second row) then it will produce the following quantized coefficient values in the quantized coefficient row 630 (third row):

| $a_1$ | $a_2$ | $c_{00}$ | $c_{01}$ | $c_{02}$ | $c_{03}$ | $c_{04}$ | $c_{05}$ |
|---|---|---|---|---|---|---|---|
| 1.05 | 0.978 | 25.37 | 4.23 | 4.67 | 5.87 | 5.05 | 6.20 |
| 1.0 | 1.0 | 1.0 | 1.0 | 2.0 | 3.0 | 4.0 | 5.0 |
| 1 | 1 | 25 | 4 | 2 | 2 | 1 | 1 |

In a particularly preferred embodiment of the invention, a method is implemented wherein different quantization tables having different quantization factors are used for different blocks, called herein dynamic quantization. In this method of dynamic quantization, the coefficients representing blocks closer to the edge of the image are divided by larger quantization factors and thus compressed to a greater extent. The coefficients representing blocks in the center area of the image are divided by smaller quantization factors, and thus preserved to a greater extent. This provides the advantage of maximized compression with minimal practical loss to image quality, as it has been found that the human eye typically devotes more attention to the center of an image than the edge of the image.

More specifically, with reference again to FIG. 4. The pixel map blocks 420 in the pixel map 410 include both center blocks 422 and edge blocks 424. The coefficients in a center block coefficient signal of the block coefficient signals representing center blocks are applied to a quantization table 600 having relatively small quantization factors, such as in the example of the quantization table 600 above. The coefficients in an edge block coefficient signal of the block coefficient signals representing edge blocks, however, are applied to a different quantization table 600 having relatively larger quantization factors for corresponding coefficients. For example, a quantization table 600 for an edge block might contain the following coefficient values in the coefficient row 610 and the following quantization factors in the quantization factor row 620, thus producing the following quantized coefficient values in the quantized coefficient row 630:

| $a_1$ | $a_2$ | $c_{00}$ | $c_{01}$ | $c_{02}$ | $c_{03}$ | $c_{04}$ | $c_{05}$ |
|---|---|---|---|---|---|---|---|
| 1.05 | 0.978 | 25.37 | 4.23 | 4.67 | 7.87 | 5.05 | 6.20 |
| 1.0 | 1.0 | 1.0 | 2.0 | 4.0 | 8.0 | 16.0 | 32.0 |
| 1 | 1 | 25 | 2 | 1 | 0 | 0 | 0 |

Note that for the nonlinear component $c_{01}$–$c_{05}$, which uses larger quantization factors, there are more zero terms produced and the nonzero terms are smaller. Thus, greater compression is achieved for an edge block 424 than a center block 422. The selection of different quantization factors will be a design choice for one of ordinary skill in the art based on the characteristics of the visual images to be compressed. It is further noted that, although only two different tables are shown, one for a center block 422 and one for an edge block 424, a greater number and sensitivity of levels may be applied to the pixel map 410, corresponding to a greater number of quantization tables. For example, in between the center block 422 level and the edge block 424 level, there could be applied one or more intermediate levels.

Returning to FIG. 3, in step 345, the sending computer 100 run length encodes the quantized coefficient signal to produce run length encoded signal and still further compress the data. Run length encoding is a well known compression technique. In run length encoding, a string of values is replaced by pairs of values in the form (distance from previous value, current value) where the distance from the previous value is the number of zeroes between the current value and the previous value.

In step 350, the sending computer 100 performs differential pulse code modulation encoding on the run length encoded signal to produce a modulated signal and yet further reduce the amount of data necessary to represent the image. Differential pulse code modulation is well known to those of ordinary skill in the art. In differential pulse code modulation encoding, the value of each coefficient in the quantized coefficient signal is replaced by the value of the difference between the value of that coefficient and the preceding coefficient in the quantized coefficient signal. For example, the values:

(25) 26 28 28 28 29 would be replaced with the values:

1 2 0 0 1 often producing much smaller values, including some zero values as above.

In step 355, the modulated signal is still further compressed using Huffman coding to produce a Huffman encoded signal. In Huffman coding, the most frequently occurring values are assigned codes having a smaller number of bits than less frequently occurring values. Huffman coding is also well known to one of ordinary skill in the art. Steps 340–355 may be chosen or ordered by one of ordinary skill in the art depending on the circumstances at hand.

Finally, in step 360, the sending computer 100 stores the Huffman encoded signal in the sending computer memory 104 as a compressed color pixel map signal representing the compressed still image.

In a preferred embodiment of the invention, the still image compression method described above is applied to multiple pixel map signals representing correspondingly multiple sequential still images, called frames, in a moving video image. Each compressed pixel map signal thus becomes a compressed frame signal in a color video signal. The frames are displayed sequentially by a display device such as the sending computer display 115 in the sending computer 100. It is also possible to transmit the video signal for display of the video image on another computer such as the receiving computer display 140 of the receiving computer 130. In the preferred embodiment, the sending computer 100 transmits the video signal via a telephone line 120 or other media, as explained above. However, transmission of the video signal is limited in speed by the restraints of whatever media is used. Thus, the preferred embodiment of the invention performs still additional compression when transmitting the video signal, herein denoted as video compression.

Figure 7:
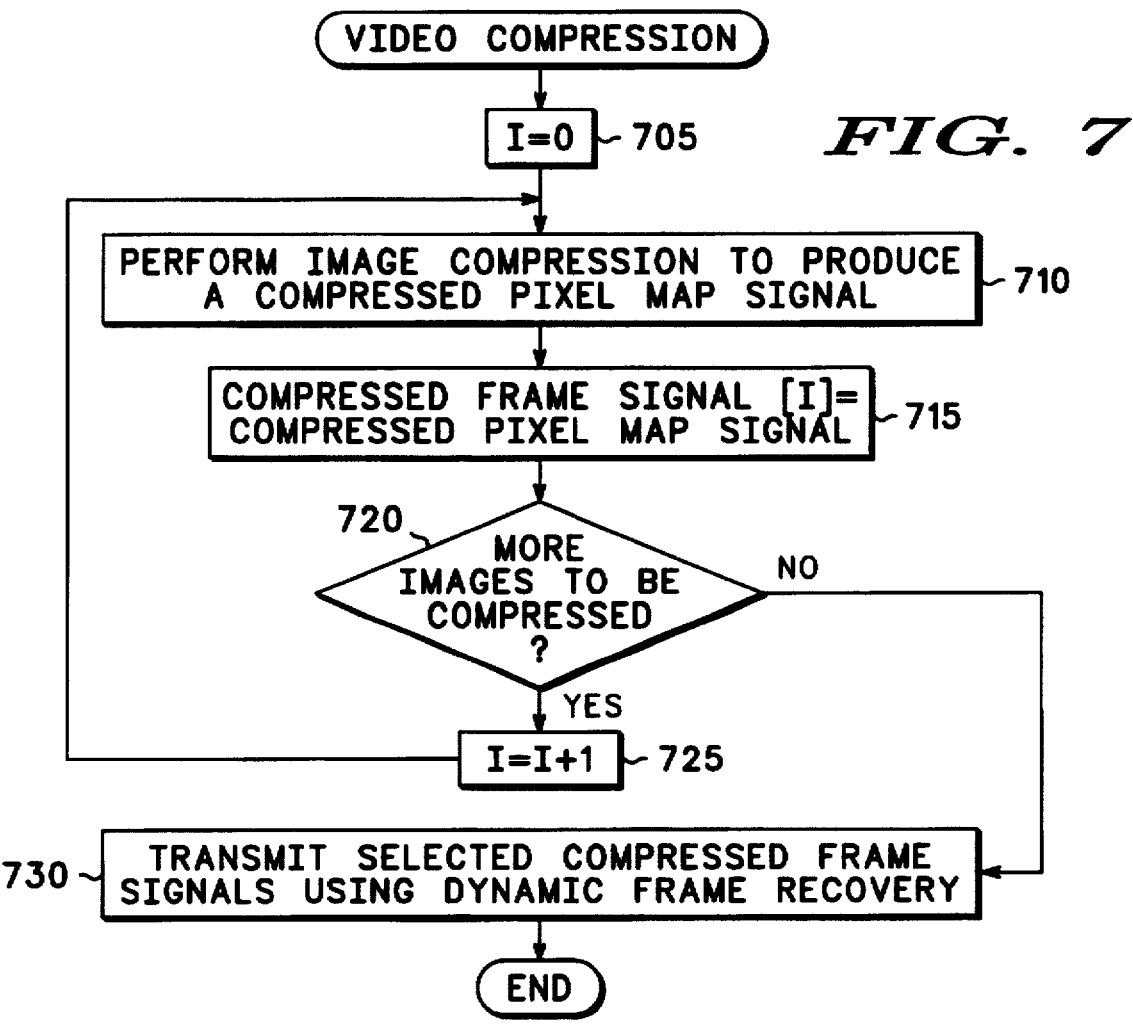
FIG. 7 is a flowchart of a video compression process performed by a preferred embodiment of the present invention.

FIG. 7 is a flowchart of a video compression process performed by a preferred embodiment of the present invention to compress the video signal for transmission. In step 705, a frame count I is initialized to zero. In step 710, the sending computer 100 performs still image compression as described above to produce a compressed color pixel map signal representing a still image. In step 715, the sending computer 100 identifies the compressed color pixel map signal as a compressed frame signal [I], for each different frame I, in the video signal, and orders the compressed frame signals in an original frame sequence in the video signal. In step 720, if more pixel map images exist, then the sending computer 100 increments the frame count I in step 725 and then loops back to perform steps 710 through 720. Otherwise, the sending computer 100 performs step 730.

As noted above, additional compression must be performed to transmit the video image within the constraints of the transmitting media, such as the telephone line 120. The preferred embodiment of the invention performs this additional compression by transmitting the compressed frame signals for only selected frames and/or selected pixel map blocks 420 within the frames to the receiving computer 130. Alternatively, the sending computer 100 could utilize this selection process to determine which frames are to be stored for display at a later time, thus saving storage space. In step 730, the sending computer 100 determines which compressed frame signals to select and transmits the selected compressed frame signals. In the preferred embodiment, this process is performed using an inventive method, herein called dynamic frame recovery, that determines which frames and/or pixel map blocks 420 can be eliminated with the least impact on the final video image quality.

Figure 8:
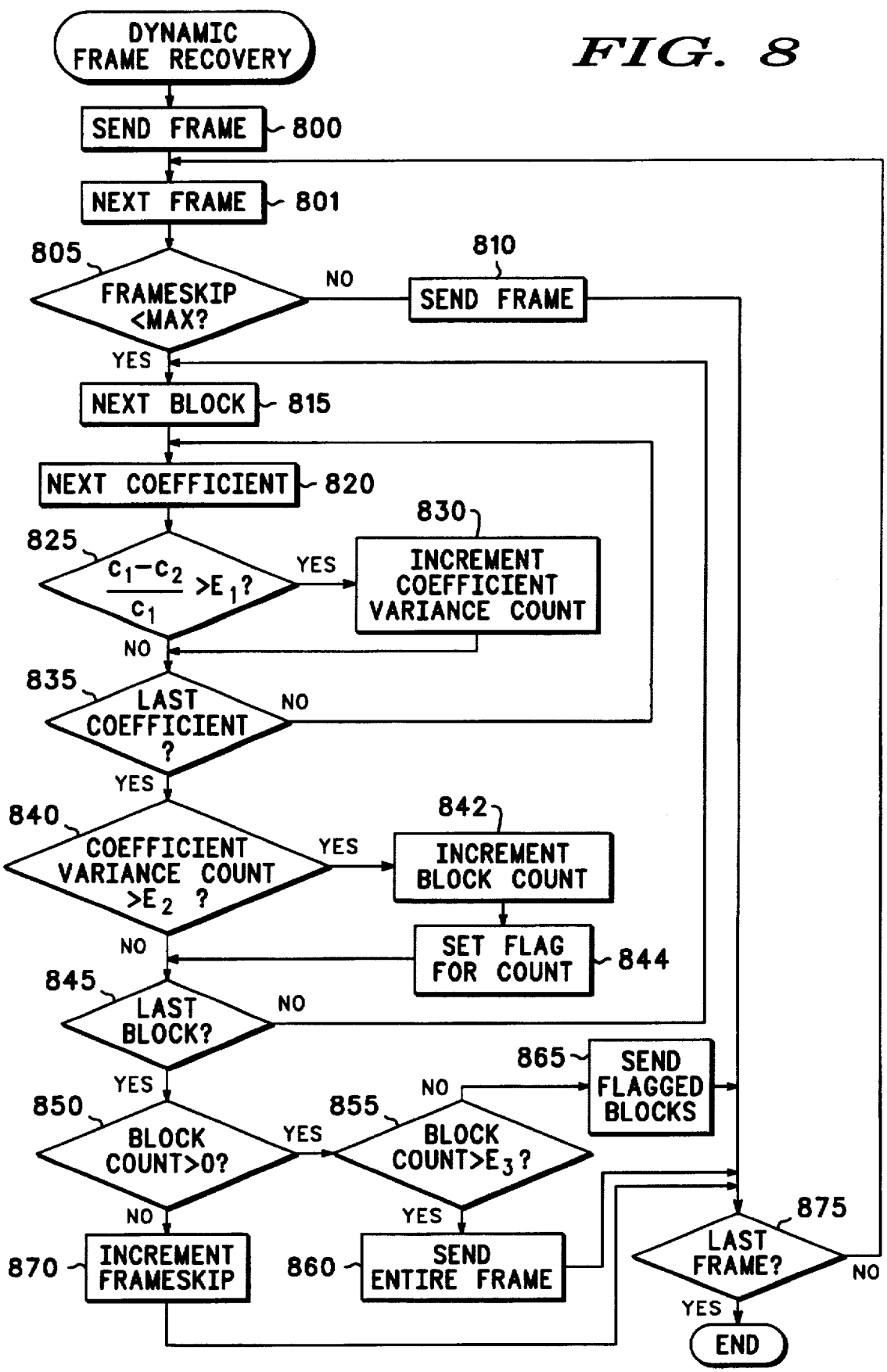
FIG. 8 is a flowchart of a dynamic frame recovery process performed by a preferred embodiment of the present invention.

FIG. 8 is a flowchart of the dynamic frame recovery process provided by the preferred embodiment of the present invention. In step 800, the compressed frame signal for the entire first frame is initially transmitted. In step 801, the sending computer 100 selects a next sequential compressed frame signal to be considered for transmission. In step 805, the sending computer 100 determines whether the number of frames skipped so far (FRAMESKIP) is less than the maximum number of frames that can be skipped (MAX). If not, the sending computer 100 sends the compressed frame signal for the entire frame automatically in step 810. The determination of what value to give MAX is a design choice for one of ordinary skill in the art based on the particular implementation. In the preferred embodiment described herein, it has been found that MAX=15 is an effective value.

If in step 805 the number of frames skipped is less than the maximum number, then the sending computer 100 selects in step 815 one of the pixel map blocks 420 to be considered for transmission of the portion of the compressed frame signal for the corresponding block (initially starting with the first block in the current frame). In step 820, the sending computer 100 selects a coefficient in the portion of the compressed frame signal representing the selected block, starting with the first sequential coefficient in the portion of the compressed frame signal for that block. Then, in step 825, the sending computer 100 computes the ratio of the difference (between the value of the selected coefficient $c_2$ and the value of the corresponding coefficient $c_1$ in the same position in the coefficient signal for the same block in the previous frame) to the value of the corresponding coefficient $c_1$ to obtain a coefficient variance amount, and compares the coefficient variance amount with a coefficient variance threshold $E_1$. If the coefficient variance amount exceeds the coefficient variance threshold then the sending computer 100 increments in step 830 a coefficient variance count of varying coefficient terms. Then, in step 835, the sending computer 100 determines whether the currently selected coefficient is the last coefficient in the portion of the compressed frame signal for the currently selected block. If not, the sending computer 100 repeats steps 820 through 835 until the last coefficient is reached.

In step 840, after all coefficients have been compared for the currently selected block with the corresponding block in the last frame, the coefficient variance count of different coefficients is compared to a coefficient variance count threshold $E_2$. If the coefficient variance count exceeds the coefficient variance count threshold, then the sending computer 100 increments a block count of different blocks in step 842 and sets a flag for the current blocks in step 844. This marks the block as one that should be transmitted because the differences with the previous pixel map blocks 420 may be significant enough to noticeably affect image quality. In step 845, the coefficient signal determines whether the currently selected block is the last block in the currently selected frame. If not, the sending computer 100 repeats steps 815 through 845 until the last of the pixel map blocks 420 in the frame is reached.

In step 850, after all blocks in the currently selected frame have been compared with the corresponding blocks in the last frame, the sending computer 100 determines in step 850 whether the block count of different blocks counted in the frame is greater than zero. If so, then the sending computer 100 determines in step 855 whether the block count for the frame exceeds a block count threshold $E_3$. If so, then the sending computer 100 transmits the compressed frame signal for the entire frame to the receiving computer 130 via the telephone line 120 in step 860. Otherwise, step 865 is performed wherein the sending computer 100 transmits only the blocks that were flagged in step 844 to the receiving computer 130. These are the blocks for which the coefficient variance count exceeded the coefficient variance count threshold. If the sending computer 100 determines in step 850 that the block count is not greater than zero, that is, that none of the blocks in the currently selected frame differ by a significant amount, then the frame is skipped altogether and not transmitted, and the sending computer 100 then increments the count of frames already skipped in step 870. After step 860, 865 or 870, the sending computer 100 determines in step 875 whether the current frame is the last frame in the video image. If not, the sending computer 100 repeats steps 801 through 875, as described above. Otherwise, the dynamic frame recovery process ends.

Upon receiving the compressed frame signals for the selected frames and blocks, the receiving computer 130 decompresses the compressed frame signals. FIG. 9 is a flowchart of the video decompression process performed by the receiving computer 130. Alternatively, where the compressed frame signals are not transmitted, but stored by the sending computer 100, this process may be performed by the sending computer 100. In step 905, the receiving computer 130 receives and stores the selected compressed frame signals transmitted by the sending computer 100 in step 730 as explained above. Steps 910–940 are performed for each of the selected compressed frame signals received.

In step 910, the receiving computer 130 decodes each compressed frame signal from a decompressed Huffman encoded signal to a decompressed modulated signal. The decompressed Huffman signal and modulated signal are referred to as "decompressed" to distinguish them from the previous modulated signal that existed as part of the compression process. This denotation will be used for the remaining signals as the decompression process is described. The process of Huffman decoding is essentially the reverse of the process of Huffman encoding performed by the sending computer 100 in step 355 of FIG. 3 and is well known in the art.

In step 915, the receiving computer 130 decodes each decompressed modulated signal to a decompressed run length encoded signal. The receiving computer 130 uses differential pulse code modulation decoding to decode each decompressed modulated signal, essentially reversing the process of differential pulse code modulation encoding performed by the sending computer 100 in step 345 of FIG. 3. Decoding by differential pulse code modulation is well known in the art.

In step 920, the receiving computer 130 decodes each decompressed run length encoded signal to a decompressed quantized coefficient signal. The receiving computer 130 decodes the decompressed run length encoded signal by run length decoding the decompressed run length encoded signal, essentially reversing the process of run length encoding performed by the sending computer 100 in step 350 of FIG. 3. Run length decoding is also well known to one of ordinary skill in the art.

In step 925, the receiving computer 130 decodes each decompressed quantized coefficient signal to a decompressed coefficient signal of decompressed block coefficient signals. The receiving computer 130 decodes each decompressed quantized coefficient signal by dequantizing the decompressed quantized coefficient signal, reversing the quantization process performed by the sending computer 100 in step 340 and previously explained in detail with reference to FIG. 6. Using the previous example for a center block 422 in the pixel map 410, given the values in the quantization table 600:

| $a_1$ | $a_2$ | $c_{00}$ | $c_{01}$ | $c_{02}$ | $c_{03}$ | $c_{04}$ | $c_{05}$ |
|---|---|---|---|---|---|---|---|
| 1.05 | 0.978 | 25.37 | 4.23 | 4.67 | 5.87 | 5.05 | 6.20 |
| 1.0 | 1.0 | 1.0 | 1.0 | 2.0 | 3.0 | 4.0 | 5.0 |
| 1 | 1 | 25 | 4 | 2 | 2 | 1 | 1 |

The quantized coefficient signal values in the quantized coefficient row 630 are decoded to coefficient signal values by multiplying each quantized coefficient value by the corresponding quantization factor in the quantization factor row 620 to produce a dequantized coefficient value. As a result, the original coefficient signal values in the coefficient row 610 are replaced as follows:

| $a_1$ | $a_2$ | $c_{00}$ | $c_{01}$ | $c_{02}$ | $c_{03}$ | $c_{04}$ | $c_{05}$ |
|---|---|---|---|---|---|---|---|
| 1.0 | 1.0 | 25.0 | 4.0 | 4.0 | 6.0 | 4.0 | 5.0 |
| 1.0 | 1.0 | 1.0 | 1.0 | 2.0 | 3.0 | 4.0 | 5.0 |
| 1 | 1 | 25 | 4 | 2 | 2 | 1 | 1 |

As can be seen above, although there is some loss of accuracy, the loss is fairly minimal in the lower frequencies in the quantization table 600 used for a center block 422.

Using the previous example for an edge block 424 in the pixel map 410, given the values in the quantization table 600:

| $a_1$ | $a_2$ | $c_{00}$ | $c_{01}$ | $c_{02}$ | $c_{03}$ | $c_{04}$ | $c_{05}$ |
|---|---|---|---|---|---|---|---|
| 1.05 | 0.978 | 25.37 | 4.23 | 4.67 | 7.87 | 5.05 | 6.20 |
| 1.0 | 1.0 | 1.0 | 2.0 | 4.0 | 8.0 | 16 | 32 |
| 1 | 1 | 25 | 2 | 1 | 0 | 0 | 0 |

Again, the quantized coefficient signal values in the quantized coefficient row 630 are decoded to coefficient signal values by multiplying each by the corresponding quantization factor in the quantization factor row 620. As a result, the original coefficient signal values in the coefficient row 610 are replaced as follows:

| $a_1$ | $a_2$ | $c_{00}$ | $c_{01}$ | $c_{02}$ | $c_{03}$ | $c_{04}$ | $c_{05}$ |
|---|---|---|---|---|---|---|---|
| 1.0 | 1.0 | 25.0 | 4.0 | 4.0 | 0.0 | 0.0 | 0.0 |
| 1.0 | 1.0 | 1.0 | 2.0 | 4.0 | 8.0 | 16 | 32 |
| 1 | 1 | 25 | 2 | 1 | 0 | 0 | 0 |

For the edge block 424, although greater compression was achieved, it can be seen that there is a corresponding greater loss of accuracy. However, the loss is minimally noticeable to the human eye because it is at the edge of the image rather than in the center of the image.

In step 930, the receiving computer 130 converts each decompressed coefficient signal of decompressed block coefficient signals to decompressed block signals representing a luminance based pixel map signal for the corresponding pixel map blocks 420 in the pixel map 410. The receiving computer 130 converts each decompressed coefficient signal into decompressed block signals by transforming the coefficients of the polynomial back to luminance based values for each pixel coordinate for the pixels in each of the pixel map blocks 420. It will be understood by one of ordinary skill in the art, in view of the above description of the relationship between the hybrid polynomial coefficients and the luminance based pixel map signal, how to reverse steps 315 and 325 of FIG. 3 to produce the block signals for each of the pixel map blocks 420 in the pixel map 410. In step 935, the receiving computer 130 aggregates the decompressed block signals into a decompressed luminance based pixel map signal for each frame.

Finally, in step 940, the receiving computer 130 averages the luminance based pixel values in the decompressed luminance based pixel map signal for the now decompressed overlap component 505 in each pixel map block 420, adjusting each block signals in the luminance based pixel map signal for the entire frame and replaces the pixels in the overlap component 505 of each block and of each adjacent block with the averaged pixel values so as to reduce a "blocking effect" that might otherwise render noticeable the edges between adjacent pixel map blocks 420 in the pixel map 410. In an alternative embodiment, the pixel values in the overlap component are not averaged. However, the overlap in the block boundaries naturally reduces the blocking effect to a significant extent without requiring additional calculation As an example of the averaging technique performed by the preferred embodiment, referring back to FIG. 5, for block A, the luminance based pixel map signal values in the vertical overlap component 505 are averaged with the luminance based pixel map signal values for the same pixels in block B and the original values for both block A and block B are replaced by the averaged values. Similarly, the values in the horizontal overlap component 505 are averaged with the values for the same pixels in block C and the original values in both block A and block C are replaced by the averaged values. The blocking effect is caused by differences in the way each pixel map blocks 420 is compressed, and is a generally known problem in the art for types of compression which involve partitioning of the pixel map representing an image. By overlapping the pixel map blocks 420 in the pixel map 410 and then averaging the overlap component 505 after decompression, the preferred embodiment of the invention minimizes the detectability of the differences between blocks to the human eye.

As the transmitted frames are received and decompressed by the receiving computer 130, the receiving computer 130 reconstructs those frames that were not transmitted before the video image can be displayed. In the preferred embodiment, the receiving computer 130 uses the process of interpolation to reconstruct the frames and blocks that were skipped in the dynamic frame recovery process of FIG. 8. FIG. 10 is a flowchart of the interpolation and display process of the preferred embodiment of the present invention. In step 1010, the receiving computer 130 interpolates an interpolated luminance based pixel map signal for the frames not transmitted. In a particularly preferred embodiment, the receiving computer 130 interpolates the interpolated luminance based pixel map signal using nonlinear interpolation.

In the nonlinear interpolation performed by the receiving computer 130, the decompressed luminance based pixel map signal for each frame received is stored in sequence. The frames not transmitted between two transmitted frames are interpolated based on a second and third frame (the two transmitted frames) and a first frame (the previously transmitted frame). For example, if frames 1, 5 and 10 are transmitted, then frames 6–9 are interpolated based on frames 1, 5 and 10. The nonlinear interpolation applies the following formula to interpolate each pixel, where I is the frame number of the frame being interpolated, $PI_i$ is the value of a pixel in the frame being interpolated, $PI_1$ is the value of the pixel in the same coordinates in the previous frame, and $PI_2$ and $PI_3$ are the values of the pixels in the same coordinates in the frames between which $PI_i$ is to be reinserted:

$$P_{I_i} = \frac{(I-I_2)(I-I_3)}{(I_1-I_2)(I_1-I_3)} P_{I_1} +$$
$$\frac{(I-I_1)(I-I_3)}{(I_2-I_1)(I_2-I_3)} P_{I_2} +$$
$$\frac{(I-I_1)(I-I_2)}{(I_3-I_1)(I_3-I_2)} P_{I_3}$$

For example, if $I_1=1$, $I_2=5$ and $I_3=10$, then frame 6 ($I_i=6$) would be interpolated as:

$$P_6 = \frac{(6-5)(6-10)}{(1-5)(1-10)} P_1 +$$
$$\frac{(6-1)(6-10)}{(5-1)(5-10)} P_5 +$$
$$\frac{(6-1)(6-5)}{(10-1)(10-5)} P_{10}$$
$$P_6 = (-.111\ldots)P_1 + (1.0)P_5 + (.111\ldots)P_{10}$$

Thus, using a simple example, if $P_1$ were 10, $P_5$ were 50 and $P_{10}$ were 100, $P_6$ would be $-1.11\ldots +50+11.11\ldots =60$.

In step 1020, the receiving computer 130 orders the decompressed luminance based pixel map signals for each transmitted frame and the interpolated luminance based pixel map signals for each interpolated frame into the original frame sequence. Then, in step 1030, the receiving computer 130 converts each of the ordered luminance based pixel map signals into a decompressed video signal. The decompressed video signal comprises decompressed pixel map signals, each decompressed pixel map signal in the preferred embodiment being a decompressed color pixel map signal, for each frame in the original frame sequence. In step 1040, the receiving computer 130 then displays the decompressed video signal, thus reproducing the original video image.

The method and system for compressing a video signal using nonlinear interpolation described above provides the advantages of a substantially compressed video signal with minimal loss to image quality. While specific embodiments of the invention have been shown and described, further modifications and improvements will occur to those skilled in the art. It is understood that this invention is not limited to the particular forms shown and it is intended for the appended claims to cover all modifications of the invention which fall within the true spirit and scope of the invention.

What is claimed is:

1. A method of compressing a video signal, the method performed by a computer system comprising a sending computer and a receiving computer, the method comprising the steps of:

the sending computer providing a pixel map signal comprising a pixel map of pixel data representing pixels in a visual image;

the sending computer separating the pixel map signal into block signals representing pixel map blocks in the pixel map;

the sending computer converting the block signals into a coefficient signal of block coefficient signals without decompressing any said coefficient signals, each of the block coefficient signals corresponding to one of the block signals and representing, for one of the pixel map blocks in the pixel map one or more coefficients in a single hybrid polynomial, the hybrid polynomial comprising discrete cosine terms, a constant term separated from the discrete cosine terms, and polynomial terms separated from the discrete cosine terms, each of the block coefficient signals comprising a background component representing a coefficient of the constant term, a linear component representing coefficients of the polynomial terms and a nonlinear component representing coefficients of the discrete cosine terms;

the sending computer performing the providing, separating and converting steps multiple times to produce correspondingly multiple compressed pixel map signals, each compressed pixel map signal of the compressed pixel map signals being compressed frame signals in the video signal representing a video image, each of the compressed frame signals representing a frame in the video image;

the sending computer selecting selected compressed frame signals from among the compressed frame signals in the video signal;

the sending computer transmitting the selected compressed frame signals to the receiving computer;

the receiving computer converting the selected compressed frame signals each from a decompressed coefficient signal of decompressed block coefficient signals to decompressed block signals, each of the decompressed block signals corresponding to one of the decompressed block coefficient signals;

the receiving computer aggregating the decompressed block signals into a decompressed pixel map signal for each frame to produce decompressed pixel map signals for each of the selected compressed frame signals;

the receiving computer interpolating interpolated pixel map signals for each of the compressed frame signals not selected by the sending computer in the selecting step using nonlinear interpolation to interpolate a value of each of the pixels in frames sequentially ordered between a second frame and a third frame among three frames represented by three decompressed pixel map signals most recently received, based on a first frame, the second frame and the third frame;

the receiving computer ordering the decompressed pixel map signals and the interpolated pixel map signals for all of the frames into an original frame sequence to produce a decompressed video signal; and the receiving computer displaying the decompressed video signal on a display device in the original frame sequence.

2. The method of claim 1, further comprising the steps of:
the sending computer run length encoding the coefficient signal to produce a run length encoded signal; and
the receiving computer run length decoding a decompressed run length encoded signal to produce a decompressed coefficient signal.

3. The method of claim 2, further comprising the steps of:
the sending computer differential pulse code modulation encoding the run length encoded signal to produce a modulated signal; and
the receiving computer differential pulse code modulation decoding a decompressed modulated signal to produce the decompressed run length encoded signal.

4. The method of claim 3, further comprising the steps of:
the sending computer Huffman encoding the modulated signal to produce a Huffman encoded signal; and
the receiving computer Huffman decoding a decompressed Huffman encoded signal to produce the decompressed modulated signal.

5. The method of claim 1, further comprising the steps of:
the sending computer differential pulse code modulation encoding the coefficient signal to produce a modulated signal; and
the receiving computer differential pulse code modulation decoding a decompressed modulated signal to produce a decompressed coefficient signal.

6. The method of claim 5, further comprising the steps of:
the sending computer Huffman encoding the modulated signal to produce a Huffman encoded signal; and
the receiving computer Huffman decoding a decompressed Huffman encoded signal to produce the decompressed modulated encoded signal.

7. The method of claim 1, further comprising the steps of:
the sending computer Huffman encoding the coefficient signal to produce a Huffman encoded signal; and
the receiving computer Huffman decoding a decompressed Huffman encoded signal to produce a decompressed coefficient signal.

8. The method of claim 1 wherein the pixel map signal is a color pixel map signal comprising a red color component representing a red intensity of each pixel, a green color component representing a green intensity of each pixel and blue color component representing a blue intensity of each pixel.

9. The method of claim 1 further comprising the steps of:
the sending computer converting the pixel map signal to a luminance based pixel map signal comprising a luminance component representing a luminance of each pixel, a saturation component representing a saturation of each pixel and a hue component representing a hue of each pixel, the saturation component and the hue component comprising an equivalent of a smaller number of bits than the luminance component;

the receiving computer converting a decompressed luminance based pixel map signal to a decompressed pixel map signal; and wherein the step of separating the pixel map signal comprises the sending computer separating the luminance based pixel map signal into the block signals.

10. The method of claim 1 further comprising the steps of:
the sending computer quantizing the coefficient signal by dividing a coefficient value of each coefficient in the coefficient signal by a quantization factor, rounding a resulting value to produce a quantized coefficient value and replacing the coefficient value with the quantized coefficient value for each coefficient in the coefficient signal to produce a quantized coefficient signal as the compressed pixel map signal; and the receiving computer dequantizing a decompressed quantized coefficient signal by multiplying the quantized coefficient value for each coefficient in the decompressed quantized coefficient signal by the quantization factor for the coefficient to produce a dequantized coefficient value and replacing the coefficient value with the dequantized coefficient value for each coefficient in the decompressed quantized coefficient signal, to produce a decompressed coefficient signal of decompressed block coefficient signals for each of the pixel map blocks in the pixel map.

11. A computer system for compressing a video signal, the computer system comprising:
a sending computer comprising
a memory storing a pixel map signal comprising a pixel map of pixel data representing pixels in a visual image,
a sending computer processor, coupled to the memory, separating the pixel map signal into block signals representing pixel map blocks in the pixel map and converting the block signals into a coefficient signal of block coefficient signals without decompressing any said coefficient signals, each of the block coefficient signals corresponding to one of the block signals and representing, for one of the pixel map blocks in the pixel map, one or more coefficients in a single hybrid polynomial, the hybrid polynomial comprising the discrete cosine terms, a constant term separated from the discrete cosine terms, and polynomial terms separated from a discrete cosine equation, each of the block coefficient signals comprising a background component representing a coefficient of the constant term, a linear component representing coefficients of the polynomial terms and a nonlinear component representing coefficients of the discrete cosine terms, performing the separating and converting functions multiple times to produce correspondingly multiple compressed pixel map signals, each compressed pixel map signal of the compressed pixel map signals being compressed frame signals in the video signal representing a video image, each of the compressed frame signals representing a frame in the video image, selecting selected compressed frame signals from among the compressed frame signals in the video signal, transmitting the selected compressed frame signals;

a receiving computer coupled to the sending computer and receiving the selected compressed frame signals, the receiving computer comprising a receiving computer processor converting the selected compressed frame signals each from a decompressed coefficient signal of decompressed block coefficient signals to decompressed block signals, each of the decompressed block signals corresponding to one of the decompressed block coefficient signals, aggregating the decompressed block signals into each of the decompressed pixel map signals for each of the frames represented by each of the selected compressed frame signals, interpolating interpolated pixel map signals for each of the compressed frame signals not selected by the sending computer using nonlinear interpolation to interpolate a value of each of the pixels in frames sequentially ordered between a second frame and a third frame among a most recently received three frames represented by three decompressed pixel map signals most recently received, based on a first frame, the second frame and the third frame, ordering the decompressed pixel map signals and the interpolated pixel map signals for all of the frames into an original frame sequence to produce a decompressed video signal; and a display device coupled to the receiving computer and displaying the video signal in the original frame sequence.

12. The computer system of claim 11 wherein:

the sending computer processor run length encodes the coefficient signal to produce a run length encoded signal; and the receiving computer processor run length decodes a decompressed run length encoded signal to produce a decompressed coefficient signal.

13. The computer system of claim 12 wherein:

the sending computer processor differential pulse code modulation encodes the run length encoded signal to produce a modulated signal; and the receiving computer processor run length decodes a decompressed modulated signal to produce the decompressed run length encoded signal.

14. The computer system of claim 13 wherein:

the sending computer processor Huffman encodes the modulated signal to produce a Huffman encoded signal; and the receiving computer processor Huffman decodes a decompressed Huffman encoded signal to produce the decompressed modulated signal.

15. The computer system of claim 11 wherein:

the sending computer processor differential pulse code modulation encodes the coefficient signal to produce a modulated signal; and the receiving computer processor differential pulse code modulation decodes a decompressed modulated signal to produce a decompressed coefficient signal.

16. The computer system of claim 15 wherein:

the sending computer processor Huffman encodes the modulated signal to produce a Huffman encoded signal; and the receiving computer processor Huffman decodes a decompressed Huffman encoded signal to produce the decompressed modulated signal.

17. The computer system of claim 11 wherein:

the sending computer processor Huffman encodes the coefficient signal to produce a Huffman encoded signal; and the receiving computer Huffman decodes a decompressed Huffman encoded signal to produce a decompressed coefficient signal.

18. The computer system of claim 11 wherein the pixel map signal is a color pixel map signal comprising a red color component representing a red intensity of each pixel, a green color component representing a green intensity of each pixel and blue color component representing a blue intensity of each pixel.

19. The computer system of claim 11 wherein the sending computer processor converts the pixel map signal to a luminance based pixel map signal comprising a luminance component representing a luminance of each pixel, a saturation component representing a saturation of each pixel and a hue component representing a hue of each pixel, the saturation component and the hue component comprising an equivalent of a smaller number of bits than the luminance component and separates the luminance based pixel map signal into the block signals.

20. The computer system of claim 11 wherein:

the sending computer quantizes the coefficient signal by dividing a coefficient value of each coefficient in the coefficient signal by a quantization factor, rounding a resulting value to produce a quantized coefficient value and replacing the coefficient value with the quantized coefficient value for each coefficient in the coefficient signal to produce a quantized coefficient signal as the compressed pixel map signal; and the receiving computer dequantizes a decompressed quantized coefficient signal by multiplying the quantized coefficient value for each coefficient in the decompressed quantized coefficient signal by the quantization factor for the coefficient to produce a dequantized coefficient value and replacing the coefficient value with the dequantized coefficient value for each coefficient in the decompressed quantized coefficient signal, to produce a decompressed coefficient signal of decompressed block coefficient signals for each of the pixel map blocks in the pixel map.

* * * * *